(12) United States Patent
Nicolov

(10) Patent No.: US 12,286,777 B2
(45) Date of Patent: Apr. 29, 2025

(54) ORGANIC WASTE SEPARATOR FOR UNDER A SINK

(71) Applicant: ANVY TECHNOLOGIES INC., Victoria (CA)

(72) Inventor: Victor Nicolov, Victoria (CA)

(73) Assignee: Sepura Home, Ltd., Victoria (CA)

( * ) Notice: Subject to any disclaimer, the term of this patent is extended or adjusted under 35 U.S.C. 154(b) by 443 days.

(21) Appl. No.: 17/790,264

(22) PCT Filed: Jan. 6, 2020

(86) PCT No.: PCT/CA2020/000002
§ 371 (c)(1),
(2) Date: Jun. 30, 2022

(87) PCT Pub. No.: WO2021/138729
PCT Pub. Date: Jul. 15, 2021

(65) Prior Publication Data
US 2023/0038346 A1 Feb. 9, 2023

(51) Int. Cl.
*E03C 1/264* (2006.01)
*B01D 29/35* (2006.01)
(Continued)

(52) U.S. Cl.
CPC .............. *E03C 1/264* (2013.01); *B01D 29/35* (2013.01); *B01D 29/606* (2013.01); *B01D 29/94* (2013.01);
(Continued)

(58) Field of Classification Search
CPC ......... E03C 1/264; E03C 1/266; B01D 29/35; B01D 29/606; B01D 29/94;
(Continued)

(56) References Cited

U.S. PATENT DOCUMENTS

| 7,954,739 B2 | 6/2011 | Shin-Ya |
| 8,464,970 B2 | 6/2013 | Ceru |
| 10,711,443 B2 * | 7/2020 | Nicolov ............... B01D 21/262 |

FOREIGN PATENT DOCUMENTS

| KR | 20070013932 | 1/2007 |
| WO | 2019099971 | 5/2019 |
| WO | WO-2019099971 A1 * | 5/2019 ............... E03C 1/26 |

OTHER PUBLICATIONS

WIPO, Canadian International Searching Authority, International Search Report mailed Sep. 29, 2020, International Patent Application No. PCT/CA2020000002, 3 Pages.
(Continued)

*Primary Examiner* — Madeline Gonzalez
(74) *Attorney, Agent, or Firm* — Marc Baumgartner; Baumgartner Patent Law, LLC

(57) ABSTRACT

A waste separator for attachment to a sink drain pipe is provided, the waste separator comprising: a transverse pipe, the transverse pipe including a proximal end, a distal end, a sidewall therebetween, a solid waste outlet at the distal end and a flange on the sidewall, the transverse pipe defining a transverse bore; a motor-driven, non-cutting auger which is housed in the transverse bore; a cylindrical filter around the motor-driven, non-cutting auger; a water collector below the cylindrical filter and terminating in a wastewater outlet; a sink wastewater inlet in a vicinity of the proximal end, the sink wastewater inlet normal to the transverse bore and in fluid communication with the transverse bore; a normally-closed flap valve, the normally-closed flap valve hingedly attached to transverse pipe proximate the distal end; a hinge actuator for the normally-closed flap valve; and a microprocessor, the microprocessor in electronic communication with the hinge actuator.

21 Claims, 11 Drawing Sheets

(51) Int. Cl.
*B01D 29/60* (2006.01)
*B01D 29/94* (2006.01)
*B01D 35/157* (2006.01)
*C02F 1/00* (2023.01)
*C02F 1/28* (2023.01)
*C02F 101/30* (2006.01)

(52) U.S. Cl.
CPC .......... *B01D 35/1573* (2013.01); *C02F 1/001* (2013.01); *C02F 1/283* (2013.01); *B01D 2201/16* (2013.01); *B01D 2201/34* (2013.01); *B01D 2201/54* (2013.01); *C02F 2101/30* (2013.01); *C02F 2201/004* (2013.01); *C02F 2201/005* (2013.01); *C02F 2307/00* (2013.01)

(58) Field of Classification Search
CPC ............ B01D 35/1573; B01D 2201/16; B01D 2201/34; B01D 2201/54; B01D 21/2461; B01D 21/0012; B01D 2221/02; C02F 1/001; C02F 1/283; C02F 2101/30; C02F 2201/004; C02F 2201/005; C02F 2307/00; Y02P 20/145; Y02W 30/40; B30B 9/14; A47B 77/08
USPC ....... 210/767, 435, 437, 439, 446, 447, 455, 210/143, 146, 147
See application file for complete search history.

(56) References Cited

OTHER PUBLICATIONS

WIPO, Canadian International Searching Authority, Written Opinion of the International Searching Authority mailed Sep. 29, 2020, International Patent Application No. PCT/CA2020000002, 6 Pages.
International Preliminary Report on Patentability mailed Apr. 1, 2021, International Patent Application No. PCT/CA2020000002, 10 Pages.

* cited by examiner

ORGANIC WASTE SEPARATOR FOR UNDER A SINK

CROSS-REFERENCE TO RELATED APPLICATIONS

The present invention is filed under 35 U.S.C. § 371 as the U.S. national phase of International Application No. PCT/CA2020/000002, filed Jan. 6, 2020, which designated the United States. The entire disclosures of the above-identified priority application is hereby fully incorporated herein by reference.

FIELD

The present technology is a home appliance for separating wastewater into solid waste and liquid waste. More specifically, it is an in-line, microprocessor controlled, organic waste separator for a sink drain pipe.

BACKGROUND

Over the years, the treatment of kitchen waste has changed. Garbage disposals were considered to be an acceptable method of disposing with solid waste. These appliances use a lot of water, and add an unnecessary load to sewage systems. Further, they dispose of materials that could be used as compost or for anaerobic digestion. More current approaches focus on saving the solid waste. For example, U.S. Pat. No. 9,694,362 discloses a composting garbage disposal for under sink use in a kitchen which separates food waste items into liquid and solid components. The liquid components are directed to a standard sewer or septic system. The solid components are directed to a removable storage bin. The food waste items are separated by use of a motor driven auger member which is in close proximity to the inside wall of a screened cup so that the liquid exits the screened portion of the cup and the solid exits through an aperture in the floor of the cup. A microprocessor circuit senses the strain on the drive motor and if the strain becomes excessive, automatically reverses the direction of the shaft and auger thereby releasing excess food waste that is causing the excess strain. The solid waste is retained in an open storage bin, so odours are not contained. Further, vermin would be attracted to the waste because of the odours. Still further, if not emptied regularly, the solid waste could be contaminated with mold and other fungus, leading to the release of fungal spores into the ambient environment. It is not a closed system. The placement and design of the exit tube for the solid waste would be problematic as the auger would direct the solid waste down into the bottom of the cup resulting in plugging of the opening to the exit tube, which is of a much smaller diameter than is the bottom of the cup. The placement of the exit tube and the liquid waste tube is problematic as the liquid would preferentially exit through the exit tube for the solid waste.

U.S. Pat. No. 8,464,970 discloses an under-sink waste processing appliance which includes a waste separator which extracts liquid from organic waste and passes such extracted liquid to a residential drain line. The remaining solid, in the form of organic pulp, is dried in a dryer and deposited in a removable collection receptacle. The cutter, which may be an auger, cuts the organic waste before drying it. The cutter is transversely mounted in the waste separator. The pulp outlet and the liquid outlet are at opposite sides of the waste separator, hence the motive force of the cutter pushes the organic pulp to the pulp outlet, but there is no force to direct the liquid to the liquid outlet, hence the separation of the liquid from the solid would be very poor. Thus, this is a very inefficient system. No measures have been taken to seal the system from the ambient, hence odours could be released. Drying uses a lot of energy, and causes odours to be released. Further, the resultant dried waste must be rehydrated to be used as compost.

U.S. Pat. No. 7,954,739 discloses a garbage disposal apparatus includes a shredding device for shredding garbage put in through a drain opening of a sink and a connecting member, a transverse conveying device for conveying the garbage shredded by the shredding device in a transverse direction, a dehydrating device into which the shredded garbage conveyed through the transverse conveying device is introduced and that is for dehydrating the shredded garbage while conveying the shredded garbage upward, a drying device into which the shredded garbage discharged through the dehydrating device is supplied via a chute and that is for drying the shredded garbage while rotating, and a garbage receptacle disposed under the drying device so as to be able to be pulled out, and the shredded garbage dried and reduced in volume by the drying device drops from the rotating drying device and is collected in the garbage receptacle. Drying uses a lot of energy and causes odours to be released. Further, the resultant dried waste must be rehydrated to be used as compost. It is not a closed system, as it includes an exhaust fan and a removable receptacle, which appears to have no mechanism to isolate it from the ambient.

Canadian Patent No. 3011856 discloses a waste separator for attachment to a sink drain pipe and a collection bin. The waste separator comprises: a transverse pipe, the transverse pipe including a proximal end, a distal end, a sidewall therebetween, a solid waste outlet at the distal end and a magnetic flange on the sidewall, the transverse pipe defining a transverse bore, the transverse bore housing a motor-driven auger and a cylindrical filter between the motor-driven auger and the transverse pipe sidewall; a sink wastewater inlet in a vicinity of the proximal end, the sink wastewater inlet normal to the transverse bore and in fluid communication with the transverse bore; a normally-closed solenoid valve, the normally-closed solenoid valve in a vicinity of the distal end of the transverse pipe; and a lower vessel, the lower vessel including a waste water outlet, the lower vessel defining an interior, the interior in fluid communication with the transverse bore proximate the proximal end. The collection bin has a defined volume, and while gases are trapped within the unit when the collection bin is attached to the waste separator, those gases escape once the collection bin is detached from the waste separator or when the sink plug is removed.

What is needed is a safe, easy to use waste separator for under sinks that reduces or eliminates odour release. It would be preferable if it was compact and allowed for a larger bin to be used. It would be more preferable if it was energy efficient. It would be still more preferable if it had few moving parts. It would be preferable if it reduces or eliminates accidental water escape. It would be also preferable if it was under control of a microprocessor. It would be preferable if it was a closed system when the flap valve was closed.

SUMMARY

The present technology is a safe, easy to use waste separator for under sinks that reduces or eliminates odour release. It is compact, energy efficient and has few moving parts. It reduces or eliminates accidental water escape. It is under control of a microprocessor. The waste separator allows for a larger bin to be used. It is a closed system when the flap valve is closed. The system has a low power requirement as it does not cut the solid waste, nor does it dry the solid waste.

In one embodiment, a waste separator and collector system for use under a sink is provided, the waste separator comprising: a transverse pipe, the transverse pipe including a proximal end, a distal end, a sidewall therebetween, a solid waste outlet at the distal end and a flange on the sidewall, the transverse pipe defining a transverse bore; a motor-driven, non-cutting auger which is housed in the transverse bore; a cylindrical filter around the motor-driven, non-cutting auger; a water collector below the cylindrical filter and terminating in a wastewater outlet; a sink wastewater inlet in a vicinity of the proximal end, the sink wastewater inlet normal to the transverse bore and in fluid communication with the transverse bore; a normally-closed flap valve, the normally-closed flap valve hingedly attached to transverse pipe proximate the distal end; a hinge actuator for the normally-closed flap valve; and a microprocessor, the microprocessor in electronic communication with the hinge actuator and the collector comprising: a telescoping bin which defines an interior and which includes an inner member which includes walls, a top, a push pin on a wall and a waste aperture in a wall, an outer member which includes walls, a bottom and a plurality of vertically disposed apertures in a wall for releasably engaging the push pin, and a drawer which is slidably engaged in a front of both the inner member and the outer member, wherein at least the distal end of the transverse pipe extends into the interior through the waste aperture such that the flange abuts the back of the collector and releasably seals the transverse pipe to the back.

In the system, the waste separator may further comprise a pressure sensor which is in the water collector proximate the proximal end of the transverse bore, the pressure sensor in electronic communication with the microprocessor.

In the system, the waste separator may further comprise a locking arm which is hingedly attached to transverse pipe proximate the distal end and locking arm actuator which is in electronic communication with the microprocessor.

In the system, the waste separator may further comprise a pair of gaskets between the distal end and the normally-closed flap valve.

The system may include an alarm and the collector may include a sensor which senses when the collector is full, the alarm and the sensor may be in electronic communication with the microprocessor.

In the system, the collector may further comprise a collection bin housed in the drawer in the interior.

In the system, the outer member of the telescoping bin may further comprise a plurality of air intake apertures in a wall in the vicinity of the bottom and the top includes a plurality of air vents.

In the system, the top of the telescoping bin may include a filter housing on an underside.

The system may further comprise an activated carbon filter in the filter housing.

In the system, the motor-driven auger may be a non-cutting, motor-driven auger.

In another embodiment, a method of separating organic, solid waste in waste water from liquid waste and collecting the organic solid waste is provided using the system as described above, wherein the waste separator is plumbed into a drain pipe for a sink, the method comprising: a user actuating the waste separator as waste water flows into the system; the system opening the normally-closed flap valve; the waste separator urging the organic solid waste into the telescoping bin; and the liquid waste exiting the system into the drain pipe.

The method may further comprise the user inactivating the waste separator and the system closing the normally-closed flap valve.

The method may further comprise the system autonomously closing the normally-closed flap valve.

In the method, the user may actuate the system remotely.

In another embodiment, a waste separator for attachment to a sink drain pipe is provided, the waste separator comprising: a transverse pipe, the transverse pipe including a proximal end, a distal end, a sidewall therebetween, a solid waste outlet at the distal end and a flange on the sidewall, the transverse pipe defining a transverse bore; a motor-driven, non-cutting auger which is housed in the transverse bore; a cylindrical filter around the motor-driven, non-cutting auger; a water collector below the cylindrical filter and terminating in a wastewater outlet; a sink wastewater inlet in a vicinity of the proximal end, the sink wastewater inlet normal to the transverse bore and in fluid communication with the transverse bore; a normally-closed flap valve, the normally-closed flap valve hingedly attached to transverse pipe proximate the distal end; a hinge actuator for the normally-closed flap valve; and a microprocessor, the microprocessor in electronic communication with the hinge actuator.

The waste separator may further comprise an upper pipe, the upper pipe disposed between the sink wastewater inlet and the transverse pipe, the upper pipe defining an upper bore, the upper bore in fluid communication with the sink wastewater inlet and the transverse bore.

In the waste separator, the upper pipe may include a dishwasher waste inlet.

The waste separator may further comprise a pressure sensor which is in the water collector proximate the proximal end of the transverse bore, the pressure sensor in electronic communication with the microprocessor.

The waste separator may further comprise a locking arm which is hingedly attached to transverse pipe proximate the distal end and locking arm actuator which is in electronic communication with the microprocessor.

The waste separator may further comprise a pair of gaskets between the distal end and the normally-closed flap valve.

The waste separator may further comprise a motor, the motor attached to the proximal end of the transverse pipe and driving the non-cutting auger to provide the motor-driven, non-cutting auger.

In the waste separator the flange may be a magnetic flange.

In the waste separator the hinge actuator may be a servo.

In the waste separator the locking arm actuator may be a servo.

FIGURES

DESCRIPTION

Figure 1:
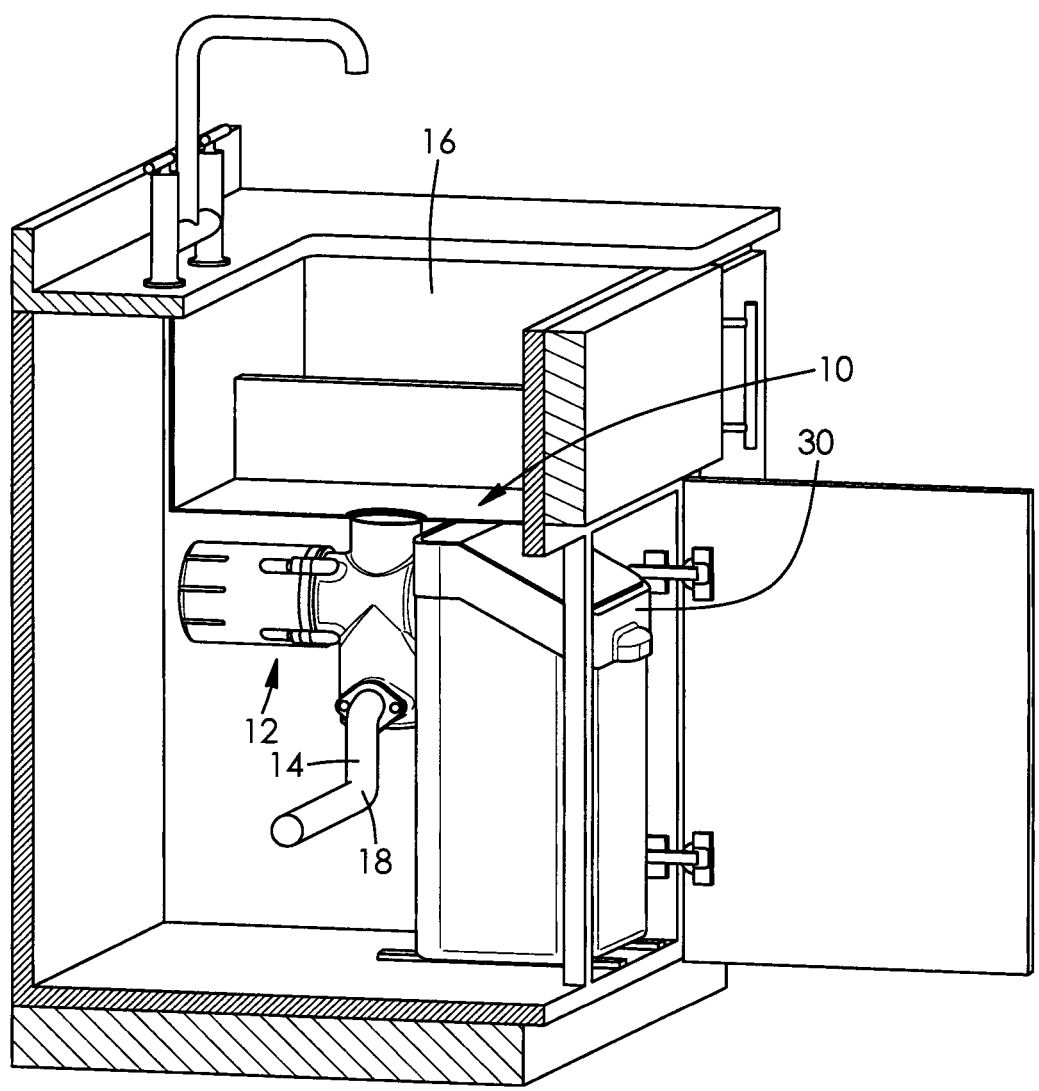
FIG. 1 is a schematic of the waste separator and collection system of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Computing device—in the context of the present technology, a computing device is a cellular phone, a tablet, a laptop, desktop or purpose-built computing device. It has a memory and a processor.

Handheld, mobile device—in the context of the present technology, a handheld, mobile device is a cell phone, a tablet or a laptop.

Dishwasher wastewater—in the context of the present technology, dishwasher wastewater is a mixture of liquid waste and organic solids that is pumped out of the dishwasher and into the drain.

Sink wastewater— in the context of the present technology, sink wastewater is a mixture of liquid waste and organic solids that is released from the sink into the drain.

Filtered wastewater—in the context of the present technology, filtered wastewater is water that has passed through the filter in the waste separator and has a significantly reduced solid organic waste content.

DETAILED DESCRIPTION

Figure 2:
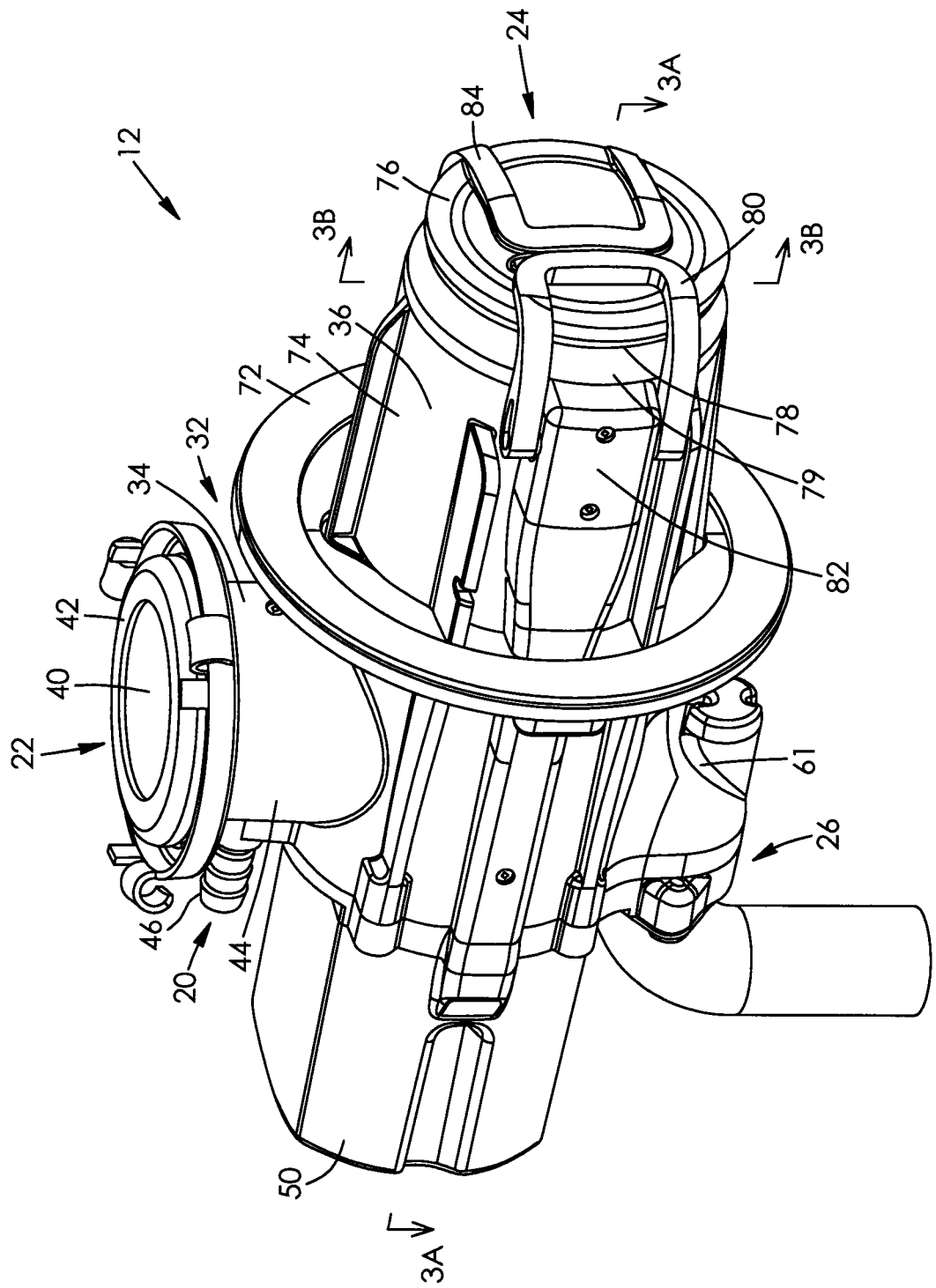
FIG. 2 is a schematic of the waste separator of the system of FIG. 1.

A waste separator and collector system, generally referred to as 10 is shown in FIG. 1. A waste separator, generally referred to as 12, is placed in-line on the drain pipe 14, between the sink 16 and the trap 18. As shown in FIG. 2, it has two inlets for waste, a dishwasher wastewater inlet, generally referred to as 20 and a sink wastewater inlet, generally referred to as 22 and two outlets, a solid waste outlet, generally referred to as 24 and a filtered water outlet, generally referred to as 26. Returning to FIG. 1, the waste separator 12 is attached to a closed bin 30.

Figure 3A:
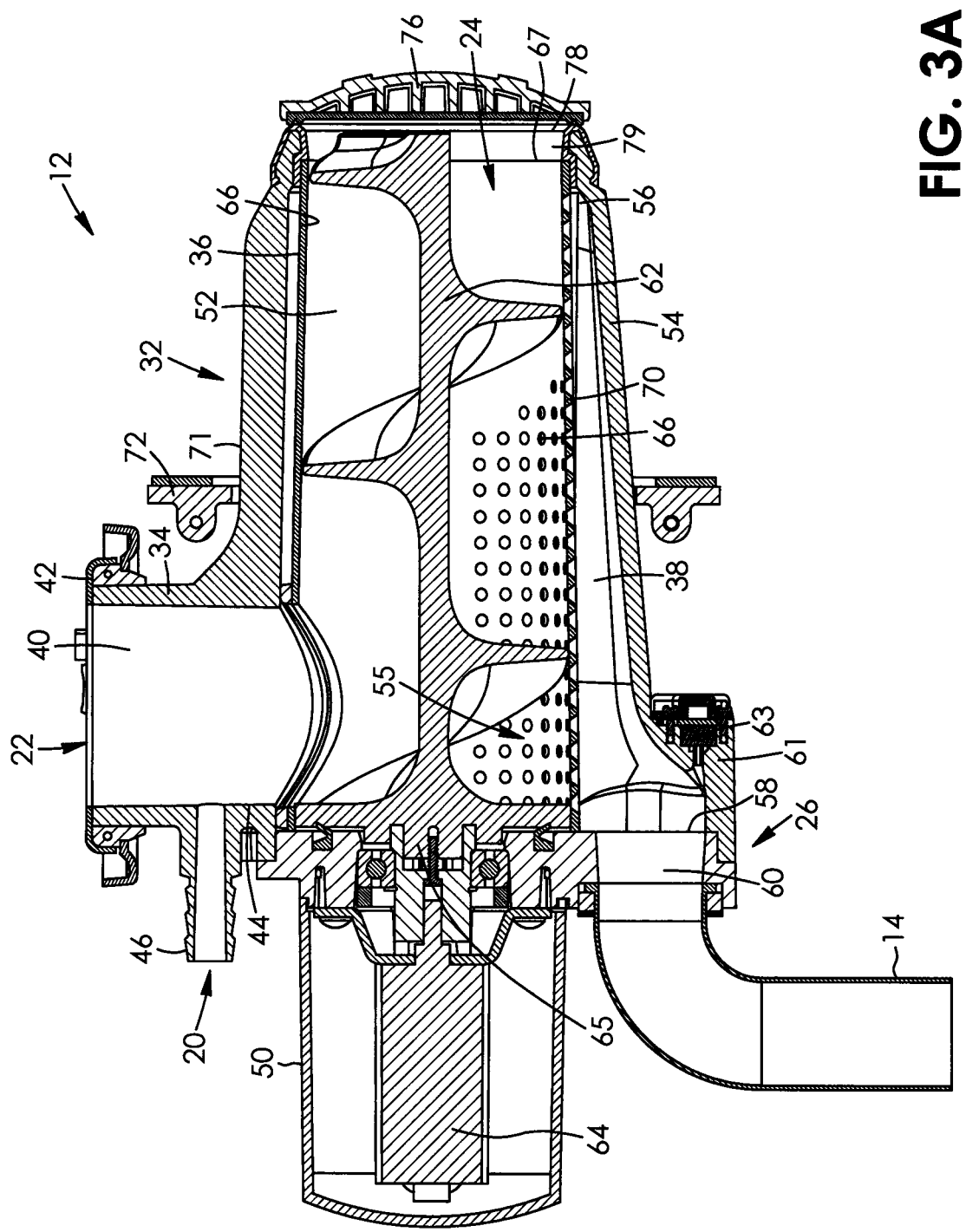
FIG. 3A is a longitudinal sectional view of the waste separator of FIG. 2 taken along line 3A.
Figure 3B:
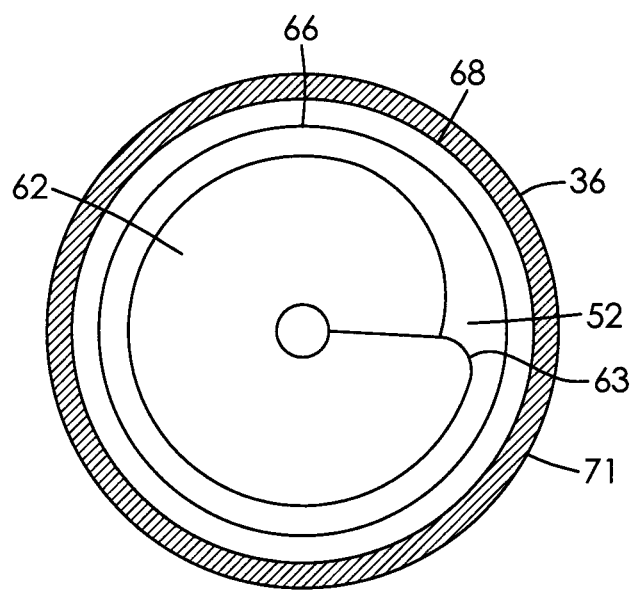
FIG. 3B is a cross sectional view of the waste separator of FIG. 2, taken along line 3B.

As shown in FIGS. 2 and 3A, a housing, generally referred to as 32, includes an upper pipe 34, a transverse pipe 36 and a wastewater collector 38 (see FIG. 3A). The upper pipe 34 has an upper bore 40 that terminates in the sink waste inlet 22. The sink wastewater inlet 22 is sized to accept the upper section of the sink drain pipe 14 (shown in FIG. 1). A flange 42 encircles the upper pipe 34 at the sink wastewater inlet 22. The dishwasher wastewater inlet 20 enters the upper bore 40 through the sidewall 44. The dishwasher wastewater inlet 20 has a male end 46 for mating with the female end of the dishwasher drain hose. An electric motor housing 50 is attached to the transverse pipe 36. As shown in FIG. 3A, the transverse pipe 36 has a transverse bore 52 that terminates distally at the solid waste outlet 24 and is connected proximally to the electric motor housing 50. The wastewater collector 38 is located below the cylindrical filter 66 and has a lower surface 54 which is sloped at an acute angle from the transverse bore 38, such that the volume increases from its distal end 56 to its proximal end 58 (which is at the filtered water outlet 26). Without being bound to theory, this promotes flow of the filtered water to the filtered water outlet 26. The filtered water outlet 26 has a drain bore 60 that is approximately the same diameter as the wastewater collector 38 at its proximal end 58. The drain bore 60 is sized to accept a standard 1.5 inch diameter disposal drain elbow of the drain pipe 14. The upper bore 40 and the region proximate the proximal end 58 of the wastewater collector 38 are vertically aligned to create a flow-through bore, generally referred to as 55. The flow-through bore 55 allows the filtered water outlet 26 to be gravity fed and reduces entrapment of the liquid waste in the organic solids being separated by the separator. A sensor housing 61 houses a pressure sensor 63. The pressure sensor 63 determines the water level in case of a flood so that the system can shut the flap valve 76 before it starts to overflow into the bin 30. The transverse bore 52 houses an auger 62 that is attached to a motor 64 at the proximal end 65 of the transverse pipe 36. The auger 62 is 3 inches in diameter with about a 3 inch pitch, which decreases towards the distal end 67 and is 8 inches long. The auger 62 is a non-cutting auger, and as shown in FIG. 3B has rounded edges 63 to ensure that it does not cut the food waste. This allows the auger to urge the food scraps to the solid waste outlet 24 without creating small particles that could clog the cylindrical filter 66. The cylindrical filter 66 is attached at both the proximal end 65 and the distal end 67 of the transverse pipe 36 and lies between the auger 62 and the inner surface 68 of the transverse pipe 36 and between the auger 62 and the water collector 38. The cylindrical filter 66 has a plurality of chamfered apertures 70. Without being bound to theory, the chamfering results in a sharp edge on each aperture 70, which reduces the chance of food particles being trapped.

As shown in FIGS. 2, and 3A a magnetic flange 72 encircles the transverse pipe sidewall 74. As shown in FIG. 3A, the distal end 67 of the transverse pipe 36 has a flap valve 76, which is a normally-closed flap valve 76. An outer gasket 78 is located on the flap valve and an inner gasket 79 is located on the distal end 67 to ensure that when the flap valve 76 is in the closed position, no water can escape from the separator 12 and no odours can escape from the bin 30. The double gasket 78, 79 reduces or eliminates water and odour escape even if there are food scraps in the area.

The liquid waste and solid organic waste enter the waste separator 12 through the dishwasher wastewater inlet 20 and the sink wastewater inlet 22. When they reach the transverse pipe 36, the auger 62 drives the organic solid waste towards the solid waste outlet 24 and the liquid waste continues to flow under the force of gravity through the filter 66 to the wastewater collector 38 as filtered wastewater. The efficiency of the process is demonstrated in Example 1.

Figure 4:
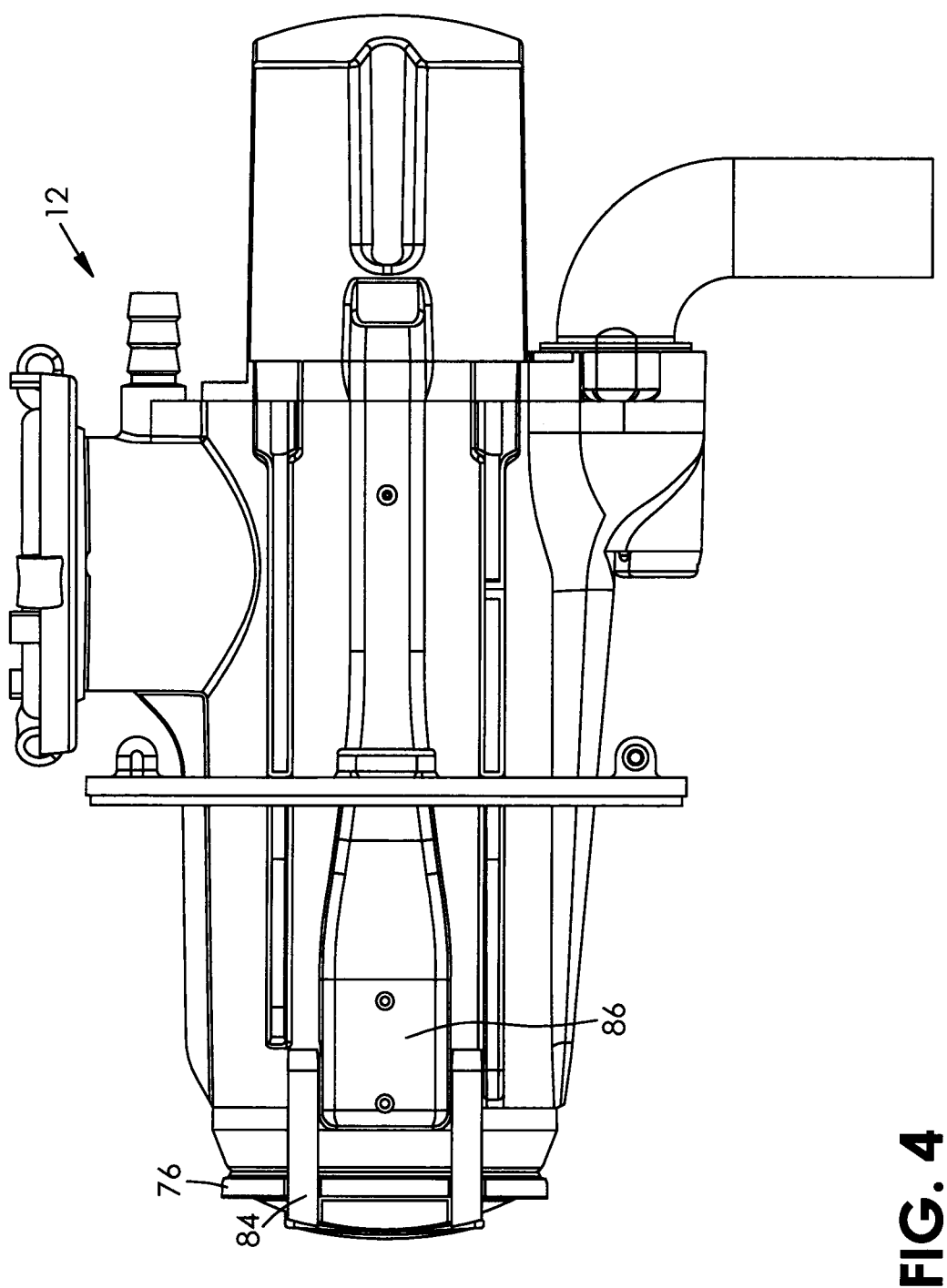
FIG. 4 is a left side view of the waste separator.

The details of the flap valve 76 are shown in FIGS. 2 and 4. It is a normally-closed flap valve 76. As shown in FIG. 2, a locking arm 80 is hingedly attached to an arm servo 82 which actuates the locking arm 80, urging it from an open position to a closed position. In the closed position, the locking arm 80 presses against the flap valve 76. As shown in FIGS. 2 and 4, a hinge 84 is attached to the flap valve 76. As shown in FIG. 4, the hinge 84 is hingedly attached to a hinge servo 86 and to the flap valve 76, which actuates the hinge 84, opening and closing the flap valve 76.

Figure 5:
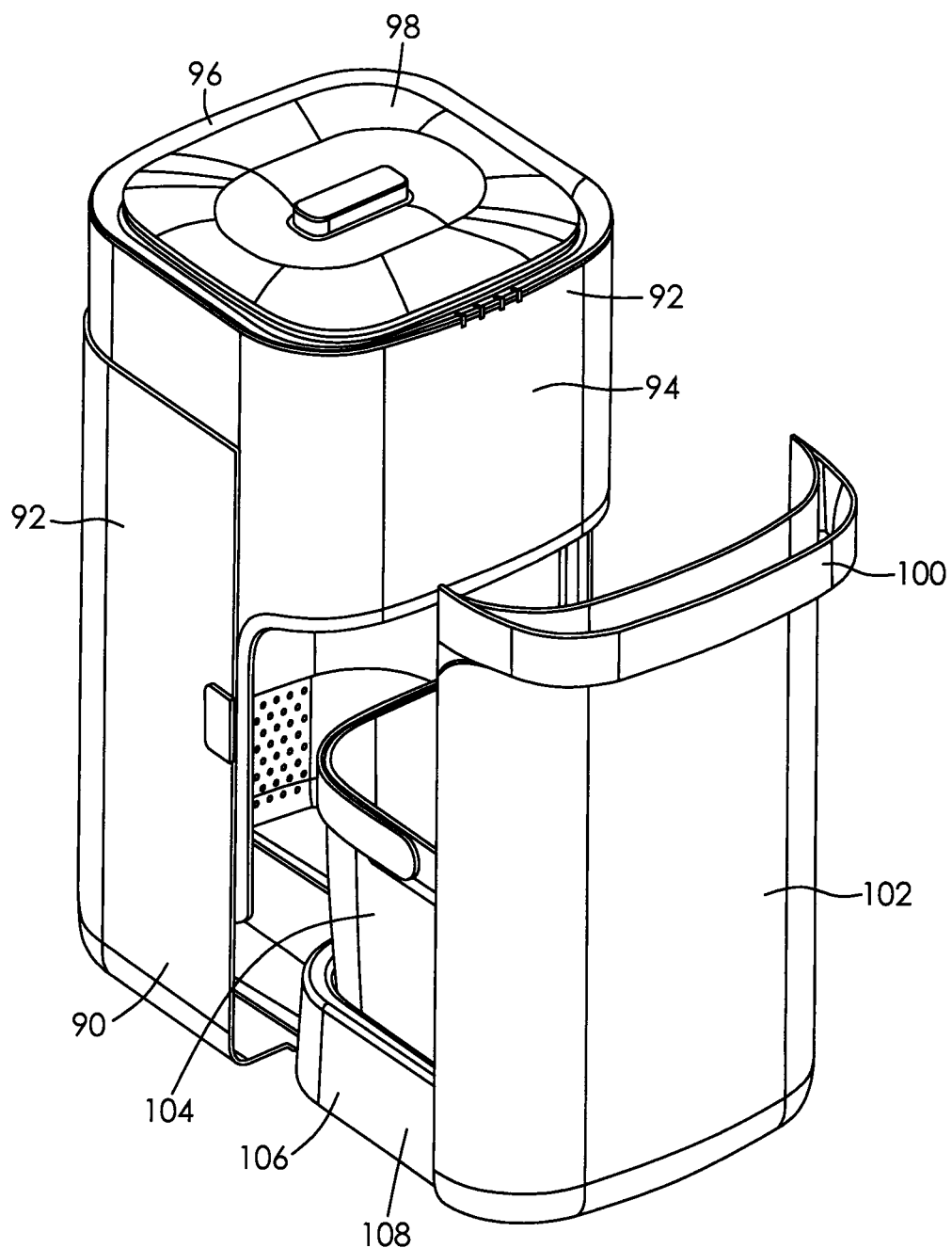
FIG. 5 is a schematic of the bin of the system of FIG. 1.

As shown in FIG. 5, the bin 30 has a bottom 90, sides 92, a front 94, a back 96 and a top 98. The front 94 includes a handle 100 on a drawer front 102. A collection bin 104 is located in the drawer 106. The drawer 106 has sides 108 which are sized to accept the collection bin 104.

Figure 6:
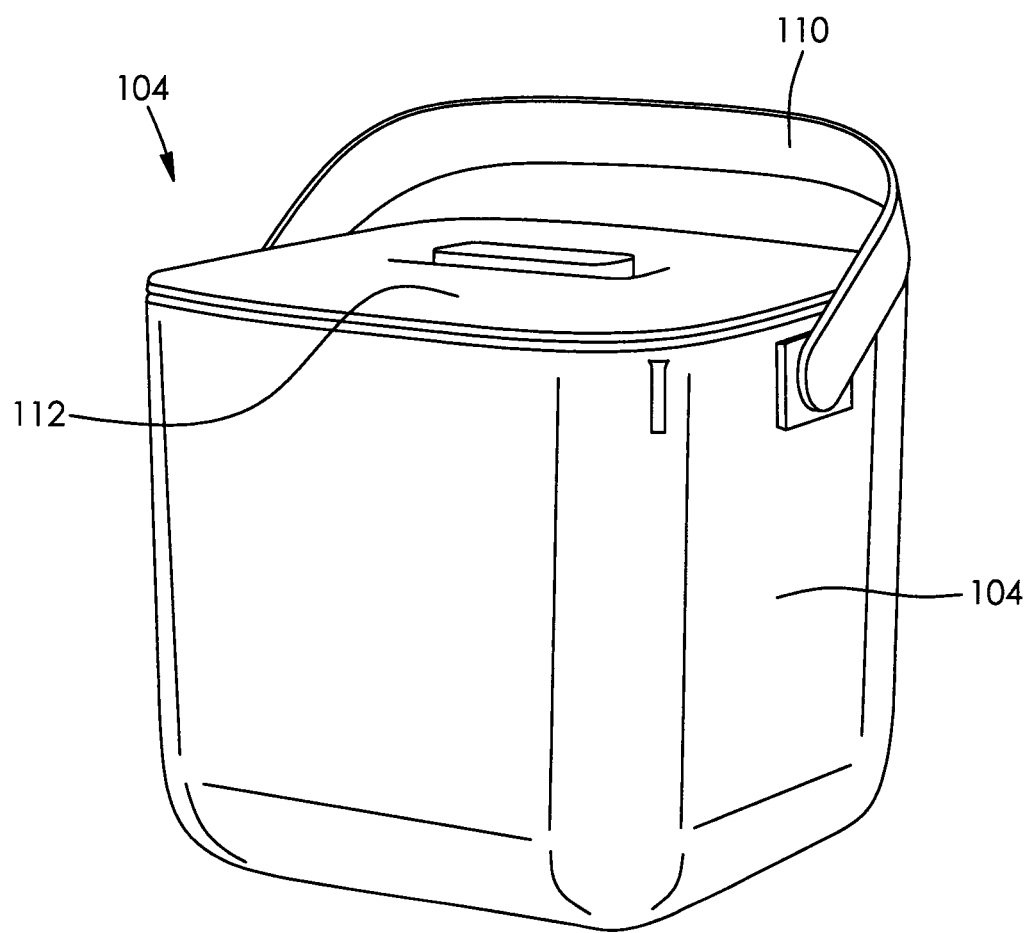
FIG. 6 is an isometric view of the collection bin.

As shown in FIG. 6, the collection bin 104 has a handle 110 and a lid 112. The corners of the collection bin 104 are all rounded so as to reduce food scraps from being trapped.

Figure 7:
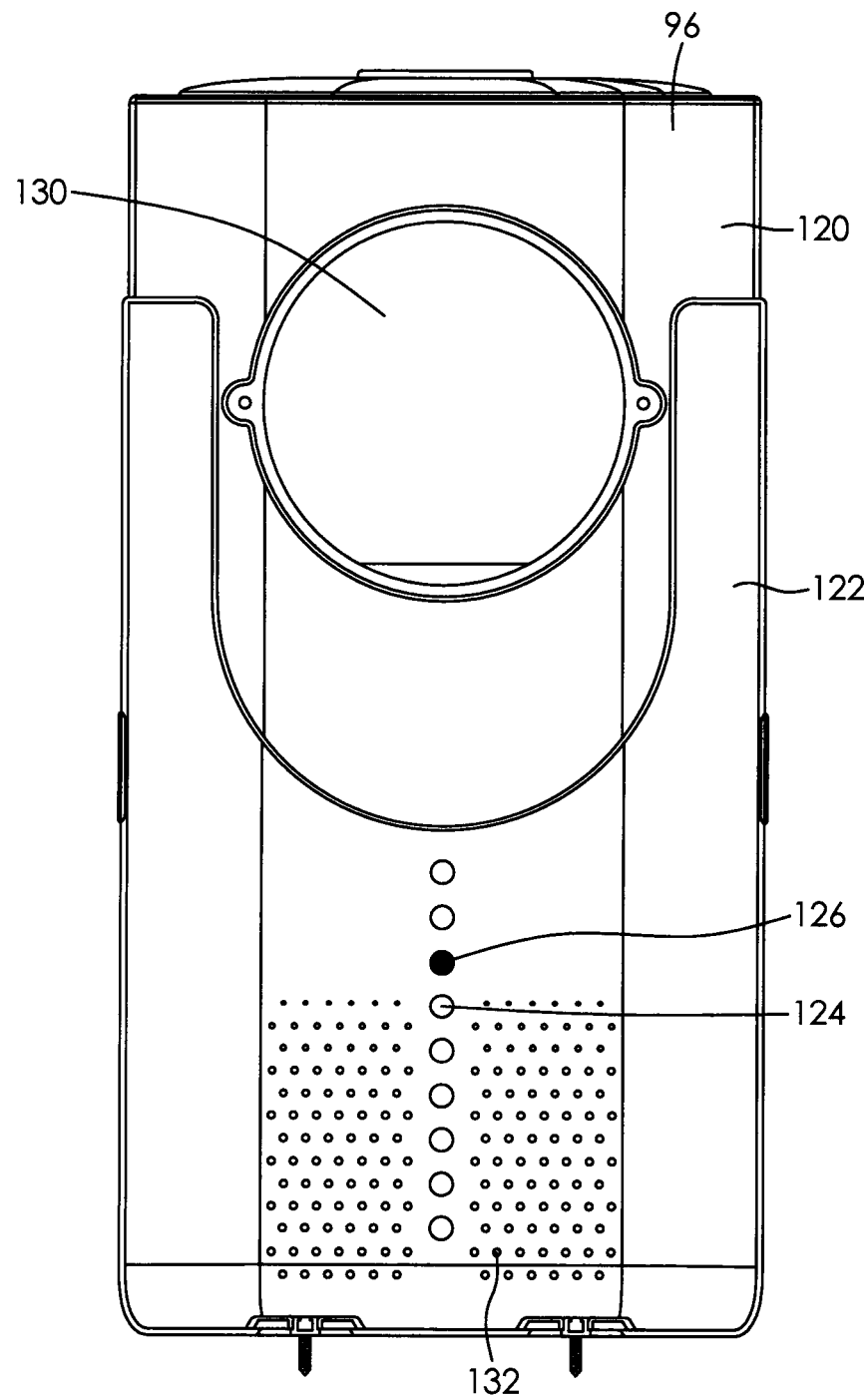
FIG. 7 is a back view of the bin.

As shown in FIG. 7, the bin 30 has a telescoping body that is defined by an inner member 120 and outer member 122. A plurality of apertures 124 in the outer member 122 of the back 96 are sized to accept a push button 126 on the inner member 120 of the back 96. In this manner, the height of the bin 30 can be adjusted to be taller or shorted depending on the height of the cabinet. Once the height is adjusted, clips are used to hold the members 120, 122 in place. A waste aperture 130 in the inner member 120 of the back 96 is sized to accept the distal end 67 of the transverse pipe 36. Air intake apertures 132 are also located in the outer member 122 of the back 96.

Figure 8:
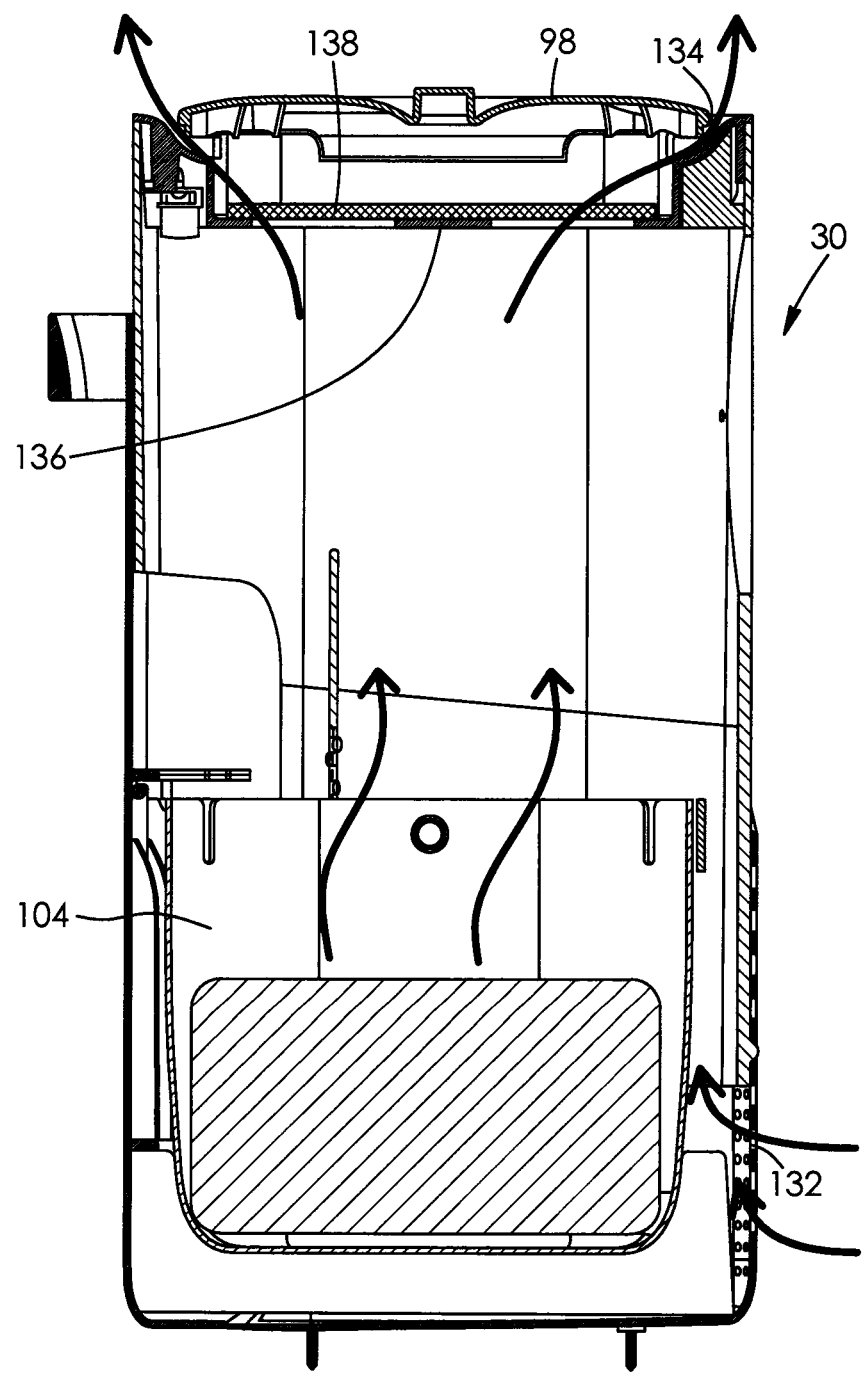
FIG. 8 is a sectional view of the bin showing air flow through the bin.

As shown in FIG. 8, air vents 134 are located in the top 98. Below the top 98 is a holder 136 for releasably retaining an activated carbon filter 138. The flow of air through the bin 30 is shown with arrows. The air flow is convective and therefore passively removes warmed air from the bin 30. Without being bound to theory, this reduces odour as heat is required in order for odour to develop.

Figure 9:
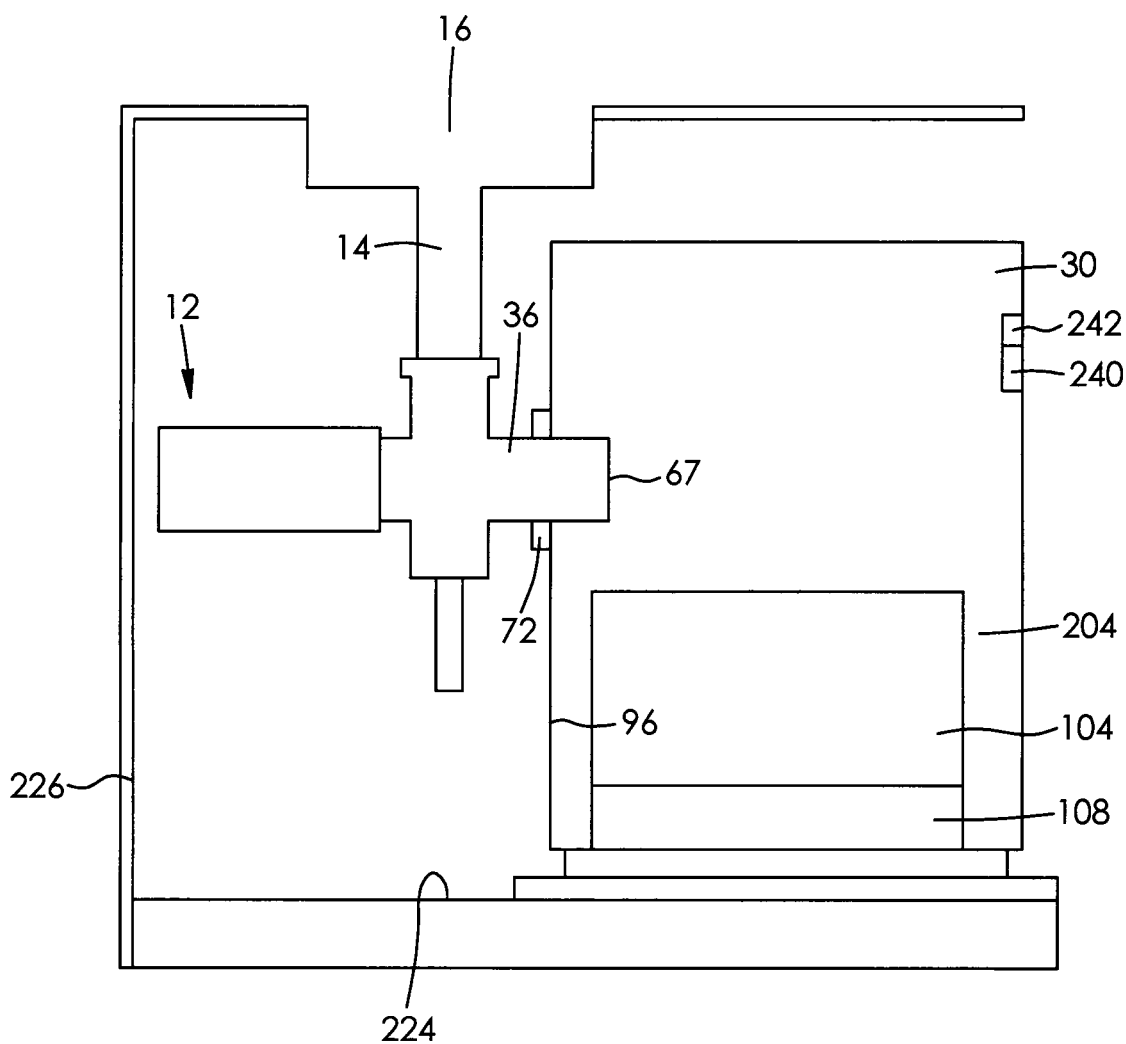
FIG. 9 is a side view of the bin in place on the waste separator in the cabinet.

As shown in FIG. 9, when the bin 30 is in the collecting position, the distal end 67 of the transverse pipe 36 is in the bin interior 204, and the magnetic flange 72 abuts the back 96, forming a magnetic seal between the back 86 and the flange 72. This magnetic seal further reduces or eliminates odours from escaping. The bin 30 is screwed onto the base 224 of the cabinet 226.

In an alternative embodiment, the flange 72 is bolted to the back 96 of the bin 30 and has a gasket that presses onto the back 96.

Figure 10:
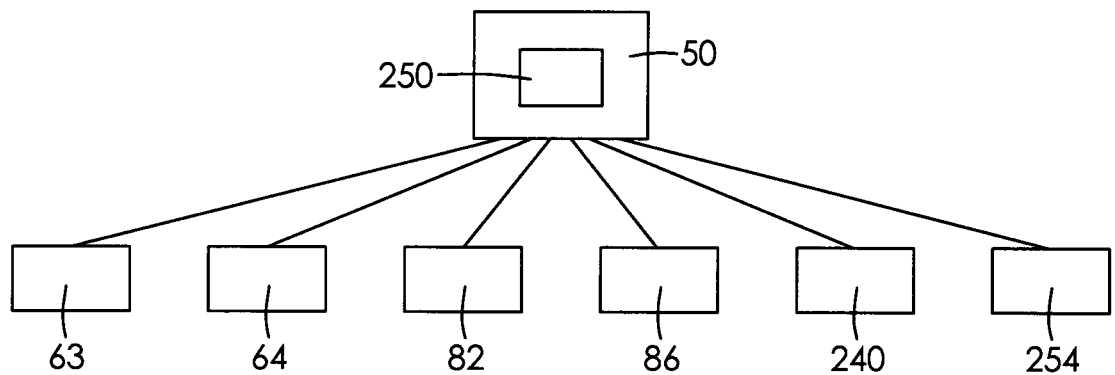
FIG. 10 is a schematic of the electronics of the system.

As shown in FIG. 10, a microprocessor 250 is housed in the motor housing 50. The motor 64, the pressure sensor 63, the arm servo 82, the hinge servo 86, a sensor 240, which is preferably an ultrasonic sensor, and an alarm 254 are under control of the microprocessor 250 and therefore they are in electrical communication with the microprocessor 250. The microprocessor 250 directs the motor 64 through different cycles other than the primary one of auguring the organic waste into the bin 30, for example running backwards to remove a blockage, running at different speeds and stopping. Returning to FIG. 9, the sensor 240 is located in the bin 30 and reports when the bin 30 is full. It may be, for example, but not limited to an ultrasonic range finder sensor, an optical sensor 240, which is angled downward, in which case a light source would be included 242, or it might be a pressure sensor that senses pressure increases caused by the organic waste pressing against the sensor, or a mechanical switch. This results in the microprocessor 250 instructing the alarm 254 to sound.

Figure 11A:
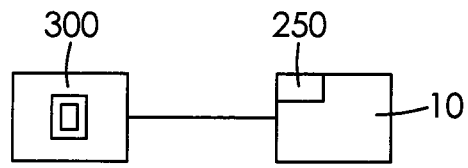
FIG. 11A is a schematic of the microprocessor and switch.
Figure 11B:
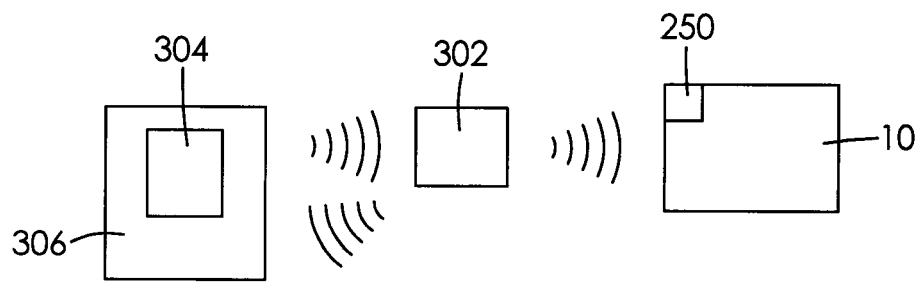
FIG. 11B is a schematic of the microprocessor and a Bluetooth radio.
Figure 11C:
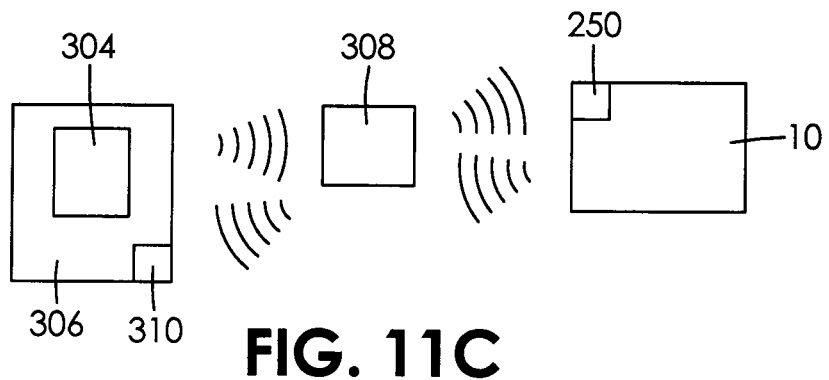
FIG. 11C is a schematic of the Bluetooth radio in further communication with an application on a mobile device.

As shown in FIG. 11A, in one embodiment, the waste separator and collector system 10 is wired to a switch 300. In another embodiment shown in FIG. 11B, the microprocessor 250 is hardwired and a Wi-Fi receiver 302 is in electrical communication with the microprocessor 250. The microprocessor 250 can autonomously control opening and closing of the flap valve 76. A Wi-Fi transceiver 304 in a mobile device 306, for example, but not limited to a cellular phone, a tablet or laptop, is in radio communication with the Wi-Fi receiver 302 and sends instructions to the microprocessor 250. In another embodiment shown in FIG. 11C, there is a Wi-Fi transceiver 308 in electrical communication with the microprocessor 250. The transceiver 308 sends organic waste weight data to an application 310 on the mobile device 306 via the Wi-Fi transceiver 304. This allows the application 310 to track the amount of waste produced over time.

Example 1

The waste separator and collector system 10 was run and the following data were obtained:
Average food waste extracted: 95%.
Average free liquids removed: 100%.
Longest dimension of solids capable of being processed (not including soft organics e.g. banana peels, which can be much larger): 3 inches.
Filter size (minimum food waste size): $5/32$ inch (noting that smaller food particles may be augured by being entrapped within larger particles).
Running time: 6 seconds minimum.
Max power: 60 W.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A waste separator and collector system for use under a sink, the waste separator comprising: a transverse pipe, the transverse pipe including a proximal end, a distal end, a sidewall therebetween, a solid waste outlet at the distal end and a flange on the sidewall, the transverse pipe defining a transverse bore; a motor-driven, non-cutting auger which is housed in the transverse bore; a cylindrical filter around the motor-driven, non-cutting auger; a water collector below the cylindrical filter and terminating in a wastewater outlet; a sink wastewater inlet in a vicinity of the proximal end, the sink wastewater inlet normal to the transverse bore and in fluid communication with the transverse bore; a normally-closed flap valve, the normally-closed flap valve hingedly attached to transverse pipe proximate the distal end; a hinge actuator for the normally-closed flap valve; and a microprocessor, the microprocessor in electronic communication with the hinge actuator and the collector comprising: a telescoping bin which defines an interior and which includes an inner member which includes walls, a top, a push pin on a wall and a waste aperture in a wall, an outer member which includes walls, a bottom and a plurality of vertically disposed apertures in a wall for releasably engaging the push pin, and a drawer which is slidably engaged in a front of both the inner member and the outer member, wherein at least the distal end of the transverse pipe extends into the interior through the waste aperture such that the flange abuts the back of the collector and releasably seals the transverse pipe to the back.

2. The waste system of claim 1, wherein the waste separator further comprises a pressure sensor which is in the water collector proximate the proximal end of the transverse bore, the pressure sensor in electronic communication with the microprocessor.

3. The system of claim 1, wherein the waste separator further comprises: a locking arm which is hingedly attached to transverse pipe proximate the distal end, and extends at least partially over the normally-closed flap valve; and locking arm actuator which is in electronic communication with the microprocessor.

4. The system of claim 1, wherein the waste separator further comprises a pair of gaskets between the distal end and the normally-closed flap valve.

5. The system of claim 1, wherein the system includes an alarm and the collector includes a sensor which senses when the collector is full, the alarm and the sensor in electronic communication with the microprocessor.

6. The system of claim 1, wherein the collector further comprises a collection bin housed in the drawer in the interior.

7. The system of claim 1, wherein the outer member of the telescoping bin further comprises a plurality of air intake apertures in a wall in the vicinity of the bottom and the top of the telescoping bin includes a plurality of air vents.

8. The system of claim 7, wherein the top includes a filter housing on an underside.

9. The system of claim 8, further comprising an activated carbon filter in the filter housing.

10. A method of separating organic, solid waste in waste water from liquid waste and collecting the organic solid waste using the system of claim 1, wherein the waste separator is plumbed into a drain pipe for a sink, the method comprising: a user actuating the waste separator as waste water flows into the system; the system opening the normally-closed flap valve; the waste separator urging the organic solid waste into the telescoping bin; and the liquid waste exiting the system into the drain pipe.

11. The method of claim 10, further comprising the user inactivating the waste separator and the system closing the normally-closed flap valve.

12. The method of claim 10, further comprising the system autonomously closing the normally-closed flap valve.

13. The method of claim 10, wherein the user actuates the system remotely.

14. A waste separator for attachment to a sink drain pipe, the waste separator comprising: a transverse pipe, the transverse pipe including a proximal end, a distal end, a sidewall therebetween, a solid waste outlet at the distal end and a magnetic flange on the sidewall, the magnetic flange facing the solid waste outlet, the transverse pipe defining a transverse bore; a motor-driven, non-cutting auger which is housed in the transverse bore; a cylindrical filter around the motor-driven, non-cutting auger; a water collector below the cylindrical filter and terminating in a wastewater outlet; a sink wastewater inlet in a vicinity of the proximal end, the sink wastewater inlet normal to the transverse bore and in fluid communication with the transverse bore; a normally-closed flap valve, the normally-closed flap valve hingedly attached to the transverse pipe proximate the distal end and reversibly covering the solid waste outlet; a hinge actuator for the normally-closed flap valve; a microprocessor, the microprocessor in electronic communication with the hinge actuator; a locking arm which is hingedly attached to the transverse pipe proximate the distal end, and extends at least partially over the normally-closed flap valve; and a locking arm actuator which is in electronic communication with the microprocessor.

15. The waste separator of claim 14, further comprising an upper pipe, the upper pipe disposed between the sink wastewater inlet and the transverse pipe, the upper pipe defining an upper bore, the upper bore in fluid communication with the sink wastewater inlet and the transverse bore.

16. The waste separator of claim 15, wherein the upper pipe includes a dishwasher waste inlet.

17. The waste separator of claim 15, further comprising a pressure sensor which is in the water collector proximate the proximal end of the transverse bore, the pressure sensor in electronic communication with the microprocessor.

18. The waste separator of claim 14, further comprising a pair of gaskets between the distal end and the normally-closed flap valve.

19. The waste separator of claim 14, further comprising a motor, the motor attached to the proximal end of the transverse pipe and driving the non-cutting auger to provide the motor-driven, non-cutting auger.

20. The waste separator of claim 14, wherein the hinge actuator is a servo.

21. The waste separator of claim 14, wherein the locking arm actuator is a servo.

* * * * *